United States Patent [19]

Sato

[11] 4,053,913
[45] Oct. 11, 1977

[54] ELECTRIC SHUTTER DEVICE FOR A FOCAL PLANE SHUTTER

[75] Inventor: Akihiko Sato, Tokyo, Japan
[73] Assignee: Nippon Kogaku K.K., Tokyo, Japan
[21] Appl. No.: 674,280
[22] Filed: Apr. 6, 1976
[30] Foreign Application Priority Data Apr. 19, 1975 Japan .................. 50-52661[U]

[51] Int. Cl.² .................................... G03B 9/34
[52] U.S. Cl. .................................... 354/244
[58] Field of Search ............. 354/234, 242, 243, 244

[56] References Cited

U.S. PATENT DOCUMENTS

| 3,759,156 | 9/1973 | Kobori | 354/243 X |
| 3,821,757 | 6/1974 | Kobori | 354/244 X |

*Primary Examiner*—L. T. Hix
*Assistant Examiner*—M. L. Gellner
*Attorney, Agent, or Firm*—Fitzpatrick, Cella, Harper & Scinto

[57] ABSTRACT

An electric shutter device for a focal plane shutter of a type having a notched gear to disconnect, upon completion of shutter charging, the connection between the winding system and a front curtain member to engageably stop a shutter front curtain in a state of the shutter being charged, a control member having a counterpart gear to be meshed with the notched gear, and engaged with the shutter travelling system in the rotational direction at the time of shutter charging, and becoming disengaged with the shutter travelling system in the rotational direction at the time of shutter release, a return spring on the control member, an engagement member to engageably stop the control member in a state of shutter charge, whereby at the time of shutter charging, the energizing force of the return spring is augmented by the rotation of the control member and, by the shutter release operation, the engagement of the engagement member is first released to cause the control member alone to rotationally return to its original position by the return spring and, at the end period of the rotational return of the control member, the engagement of the front curtain member is released to cause the shutter front curtain to run.

12 Claims, 2 Drawing Figures

ELECTRIC SHUTTER DEVICE FOR A FOCAL PLANE SHUTTER

BACKGROUND OF THE INVENTION

This invention relates to an electric shutter device for a focal plane shutter.

There has heretofore been itilized a notched gear for disconnecting engagement between the film winding system and the shutter moving system upon completion of the shutter charging operation. Further, there has also been utilized a modified construction of such electric shutter device wherein, for reducing the mass of the shutter moving member, even a counterpart gear to be meshed with the notched gear is excluded from taking part in the shutter movement. The detailed construction of this latter-mentioned device is such that a return spring is hooked onto the counterpart gear so that it may be returned by this return spring to its positional state prior to shutter charging, when the engagement between the notched gear and the counterpart gear is released, i.e. upon completion of shutter charging.

Incidentally, in the electric shutter device in the focal plane shutter, it is necessary to take various measures such as opening of a trigger switch prior to the shutter opening, closing of an FP contact for flash synchronization, or producing a warning signal for battery consumption so as to compensate for delay in de-magnetization of a control magnet. (Such functions will hereinafter be generally called "pre-shutter release action").

However, the abovementioned counterpart gear rotates to return to its pre-shutter charging state irrespective of the shutter release operation, on account of which the energy stored in the return spring is wasted.

SUMMARY OF THE INVENTION

I have conceived and contribute by the present invention a shutter device, in particular, an electrically controlled shutter device, by means of which the energy stored in the return spring mounted on a counterpart gear is not wasted.

According to a characteristic feature of the shutter device of the present invention, I combine the return motion of the counterpart gear, by the force of the return sping, into a series of electric shutter operations, wherein the energizing force of the return spring is increased at the time of shutter charging, while winding up the shutter moving system by a control member including the counterpart gear. Upon completion of the shutter charging operation, where the engagement between the notched gear and the counterpart gear is released, the control member is engageably maintained in shutter charging state, and thereafter the control member is rotationally returned to its pre-shutter charging state by release only of an engaged retaining device of the control member through the shutter release action; and, finally, at the end of the rotational return of the control member, the engaged restraint of a member which hinders travelling of a front curtain of the shutter (this member will hereinafter be referred to as "front curtain member") is released so as to cause the front curtain of the shutter to travel.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject of the clims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification, wherein:

FIGS. 1 and 2 are respectively perspective views showing different states of one embodiment of the shutter device according to the present invention, wherein FIG. 1 shows a pre-shutter charging state, and FIG. 2 shows completion of the shutter charging.

DETAILED DESCRIPTION OF THE PREFERRED EMBODIMENTS

Figure 1:
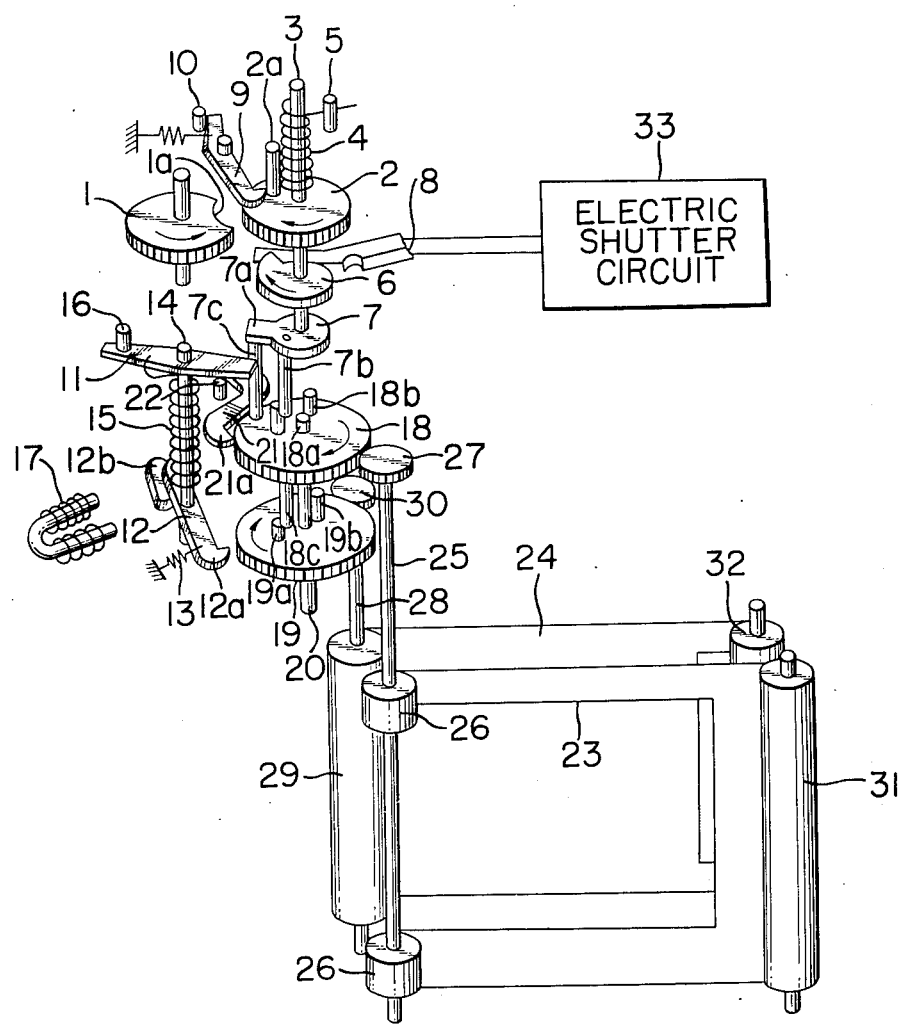

Referring now to FIG. 1 which shows a pre-shutter charging state, a notched gear 1 having a notched part 1a is interlocked with a film winding lever (not shown). On the other hand, a control hook pin 2a is embedded into a control gear 2 which corresponds to a counterpart gear to be meshed with the notched gear 1. The control gear 2 is axially supported on a control shaft 3 rotatably supported on the main body of the camera. Around this control shaft 3, there is wound a control spring 4, one end of which is hooked onto the abovementioned control hook pin 2a, and the other end of which is hooked onto a spring hooking pin 5 fixedly provided on the camera main body, the spring exerting an energizing force in the anti-clockwise direction to the control gear 2. The control shaft 3 is further provided with a control disc 7 having a switch control cam 6 and a projection 7a fixed thereon. A contact piece of a trigger switch 8 to be opened in advance of the shutter opening operation contacts one part of the control cam 6 to compensate for the time delay in de-magnetization of a magnet 17. The trigger switch 8 is in turn connected to a known electric shutter circuit 33 which controls the magnet 17 to impart appropriate speed to the shutter or to perform manual shutter timing control upon its receipt of data such as the quantity of incident light through a photographic lens, ASA sensitivity of film, and so on. In the control disc 7, there are embedded a connecting pin 7b and a front curtain hook release pin 7c. With the above-described component parts 2, 6 and 7, a control member is constructed.

A control hook lever 9, energized in the anti-clockwise direction, is engageable with the control hook pin 2a of the abovementioned control gear 2, and its rotational movement in the clockwise direction for its return to the original state is limited by a pin 10. This control hook level 9 corresponds to the shutter release means. A magnet charging lever 11, to be rotated in the anti-clockwise direction by the control disc 7, and the front curtain hook lever 12, energized in the clockwise direction by the spring 13, are respectively rotatably held on the same shaft 14. Around this shaft 14, there is wound a magnet charging spring 15, one end of which is held on the magnet charging lever 11 to impart an energizing force in the clockwise direction, and the other end of which is held on the rear curtain hook lever 12 to impart an energizing force in the anti-clockwise direction. The rotational movement of the magnet charging lever 11 is limited by a pin 16. At one end of the rear curtain hook lever 12, there is formed a pawl 12a to be engaged with a rear curtain hook pin 19b of a large gear 19 for the rear curtain, which will be described hereinafter, and at the other end of the lever 12 there is formed an armature 12b to be attracted to the magnet 17 of the electric shutter circuit. With the above-described component parts 11 through 16 inclusive, a rear curtain member is constructed.

A large gear 18 for the front curtain, and the abovementioned large gear 19 for the rear curtain, are rotatably supported on one and the same shaft 20. On the upper surface of the large gear 18 for the front curtain, there are implanted a first connecting pin 18a and a front curtain hook pin 18b, and, on the lower surface thereof, there is implanted a second connecting pin 18c. On the other hand, on the upper surface of the large gear 19 for the rear curtain, there are implanted a contact pin 19a which engageably contacts the second connecting pin 18c, and the abovementioned rear curtain hook pin 19b. The front curtain hook lever 21, energized in the anti-clockwise direction, is provided with a pawl 21a which engageably contacts the front curtain hook pin 18b, the rotational movement of which is restricted by a pin 22. This front curtain hook lever 21 relates to the front curtain member.

A focal plane shutter is constructed with a front curtain 23 and a rear curtain 24, wherein a shaft 25 for the front curtain has a front curtain pulley 26 and a front curtain small gear 27, both being fixedly mounted thereon; and another shaft 28 for the rear curtain has a rear curtain drum 29 and a rear curtain small gear 30, both being fixedly mounted thereon. Spaced apart from the front curtain shaft 25 and the rear curtain shaft 28, and in parallel therewith are, respectively, a front curtain driving drum 31 and a rear curtain driving pulley 32.

The functions of the shutter device of the aforedescribed construction will now be explained hereinbelow.

For shutter charging from the condition shown in FIG. 1, a film wind-up lever (not shown) is wound up whereupon the notched gear 1 rotates in its arrow direction in the drawing to cause the control gear 2 to rotate in its arrow direction. By this rotation, the control spring 4 increases its energizing force in the anti-clockwise direction, while the trigger switch 8 changes its state from open to closed by means of rotation of the control cam 6 which is integrated with the control gear 2.

The large gear 18 for the front curtain is rotated in the same arrow direction as that of the control member 2, 6, 7 due to the engaging contact of the first connecting pin 18a and the connecting pin 7b of the control disc 7. Similarly, the large gear 19 for the rear curtain 24 is rotated in the same arrow direction as that of the control member 2, 6, 7 due to the engaging contact of the connecting pin 19a and the second connecting pin 18c of the large gear 18 for the front curtain 23. As a result, the front curtain 23 is wound up on the front curtain pulley 26 through the front curtain small gear 27 in mesh with the large gear 18, while the rear curtain 24 is wound up on the rear curtain drum 29 through the rear curtain small gear 30 in mesh with the gear 19.

Figure 2:
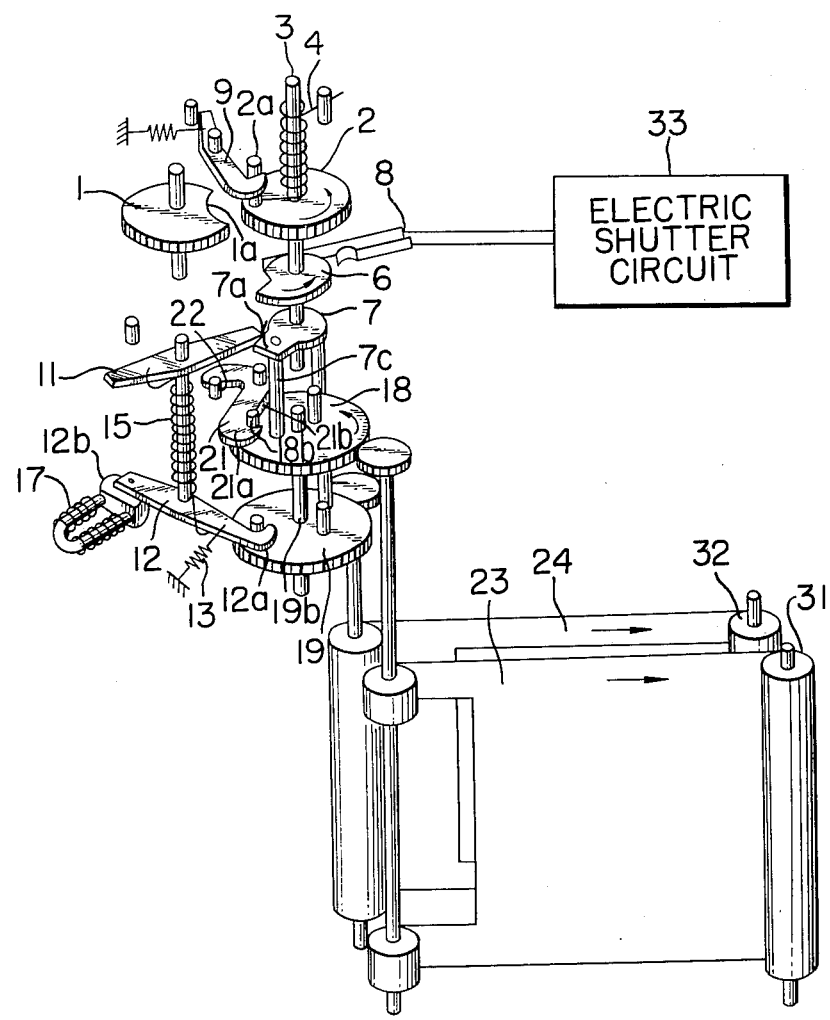

Moreover, in the latter half of the rotation of the control member 2, 6, 7, the projection 7a of the control disc 7 contacts the magnet charging lever 11 in an engaging manner to cause the magnet charging lever 11 to rotate in the anti-clockwise direction, as shown in FIG. 2. By this rotational movement, the energizing force of the magnet charging lever 15 becomes augmented, whereby the rear curtain hook lever 12 is also rotated in the anti-clockwise direction, overcoming the force of the spring 13, and the pawl 12a is engaged with the rear curtain hook pin 19b which has rotated in the clockwise direction, and the armature 12b is urged to the magnet 17. Incidentally, by the engagement of the pawl 12a and the pin 19b, the large gear 19 for the rear curtain is hindered in its rotational return motion, and the rear curtain 24 is engageably stopped at the shutter charging position.

Now, when the shutter charging operation is completed, the notched portion 1a of the notched gear 1 rotationally moves up to a position where it is opposite the control gear 2, whereby the meshing of the notched gear 1 and the control gear 2 is released, although the control gear 2 is prevented from rotational return motion by the engagement of the control hook pin 2a and the control hook lever 9, as shown in FIG. 2.

In the same manner, the large gear 18 is prevented from rotational return motion by engagement of the front curtain hook pin 18b and the front curtain hook lever 21, whereby the front curtain 23 is engageably stopped at the charged position thereof.

When a switch of the electric shutter circuit 33 is closed, by the action of the switch control cam 6, the magnet 17 is excited, whereby the armature 12b of the rear curtain lever which is urged to the magnet 17 is attracted, and the lever 12 is maintained in the state shown in FIG. 2.

When the shutter release operation is conducted, the control hook lever 9 is rotated in the clockwise direction by an expedient (not shown in the drawing) to disengage the lever 9 from the control hook pin 2a, whereby the control gear 2 commences rotation in the arrow direction illustrated in FIG. 2, due to the effect of the control spring 4. By the rotation of the switch control cam 6 in the arrow direction of FIG. 2, following this rotation of the control gear 2, the trigger switch 8 is opened, a capacitor in the electric shutter circuit 33 begins to be charged, and the shutter opening time is controlled by this charging time of the capacitor. The reason for the trigger switch 8 being opened in advance of the shutter opening is that the de-magnetization of the magnet 17 is not instantaneous.

Further, at the end of rotation of the control disc 7, the front curtain hook release pin 7c contacts the side surface 21b of the front curtain hook lever 21 in an engaging manner to cause the lever 21 to rotate in the clockwise direction, thereby causing the pawl 21a to withdraw from the front curtain hook pin 18b. As a result, the front curtain 23 travels in the arrow direction by the driving force of the front curtain driving drum 31, whereby the shutter is opened.

In the former half of rotation of the control member 2, 6, 7, the energizing force of the magnet charging spring 15 is imparted to the control member 2, 6, 7 for its rotation through the magnet charging lever 11 and the control disc 7.

When electric current supply to the magnet 17 is interrupted by the known method for obtaining a shutter speed to render appropriate exposure, the rear curtain lever 12 is rotated in the clockwise direction by the energizing force of the spring 13, and the engagement thereof with the rear curtain hook pin 19b is released.

Accordingly, the rear curtain 24 travels in the arrow direction (FIG. 2) by the driving force of the rear curtain driving pulley 32 to close the shutter; in other words, the positional state shown in FIG. 1 is resumed.

In the above-described embodiment of the present invention, the control member is composed of three separate and individual component parts, namely: control gear 2, control cam 6, and control disc 7. It is however possible that these component parts may be integrally constructed. Also, closure of the FP contact to perform the pre-shutter release operation can be simply performed by connecting one contact piece of the contact point switch to the control cam 6 or control disc 7 in an engaging manner.

Furthermore, in the present embodiment, the shutter construction is of the two-shaft type, wherein the front curtain pulley 26 and the rear curtain drum 29 are separated by the two shafts. It is, of course, possible that the present invention may be applied to the single-shaft type, wherein both front and rear curtains are held on a single, common shaft.

Thus, from the foregoing description, it will be seen that a series of shutter operations by the electric shutter are caused to be performed by the return motion of the return spring provided on the control member having a gear meshing with a notched gear, so that the force of the return spring can be effectively utilized without waste, whereby it becomes unnecessary to use a separate shutter release member or front curtain release member, and it also becomes possible to construct the electric shutter device in a simple manner.

I believe that the construction and operation of my novel shutter device will now be understood and that the advantages thereof will be fully appreciated by those persons skilled in the art.

I claim:

1. In a focal plane shutter device having: film winding means; shutter moving means including a front curtain interlocked part interlocked with a shutter front curtain energized for movement in the operational direction for shutter release and a rear curtain interlocked part interlocked with a shutter rear curtain energized for movement in the same direction as that of said front curtain; a front curtain member being disposed in a displaceable manner at a first position engageably to stop said front curtain interlocking part and at a second position to enable the shutter front curtain to travel by release of said front curtain interlocking part; a rear curtain member displaceably provided at a first position engageably to stop said rear curtain interlocking part, and at a second position to enable the shutter rear curtain to travel by releasing said rear curtain interlocking part; and rear curtain control means engageably to stop said rear curtain member at said first position until lapse of a predetermined exposure time commencing at shutter release operation, the improvement which comprises:
  a. control means interlocked with the film winding operation to charge the shutter at the time of film winding by actuating said shutter moving means, and to displace each of said front and rear curtain members to said respective first positions, and including means for accumulating positional energy, said control means being operable to displace said front curtain member to the second position at the time of shutter release by discharging the positional energy accumulated during film winding; and
  b. shutter release means disposed engageably to retain said control means in a shutter charging condition.

2. The device as defined in claim 1, wherein said control means include means enabling said rear curtain member to move toward said second position at the time of shutter release.

3. The device as defined in claim 2, wherein said control means includes:
  a. a rotatably mounted control member; and
  b. energizing means adapted to energize said control member in a rotational direction at the time of shutter release.

4. The device as defined in claim 3, wherein said rear curtain control means includes switch means cooperable with said control member for opening and closing thereof to obtain an information on commencement of the shutter release operation.

5. The device as defined in claim 4, wherein said control member includes a cam for operating said switch means.

6. The device as defined in claim 4, wherein said rear curtain member is provided in such a manner that it displaces to said first position in an interlocking manner with rotation of said control member at the time of shutter charging, while accumulating positional energy, and displaces to said second position by discharging said positional energy after release thereof by said rear curtain control means.

7. The device as defined in claim 6, further comprising: interlocking release means engaged with said control member, and interlocked with the film winding operation to be released from its engagement with the control member at the completion of shutter charging.

8. The device as defined in claim 7, wherein said interlocking release means is a gear provided with a notch by which the engagement with a counterpart gear is released.

9. The device as defined in claim 8, wherein said control member includes:
  a. a gear capable of meshing with said notched gear;
  b. a first engagement part capable of being engaged with said shutter moving means at the time of rotation;
  c. a second engagement part capable of being engaged with said front curtain member;
  d. a third engagement part capable of being engaged with said rear curtain member; and
  e. a rotary cam to actuate said switch means.

10. The device as defined in claim 9, wherein said rear curtain member comprises:
  a. an engagement member capable of being engaged with the rear curtain interlocking part of said shutter moving means;
  b. an interlocking member capable of being engaged with the third engagement part of said control member provided in a manner mutually rotatable with said engagement member;
  c. a first energizing means interposed between said engagement member and said interlocking member, and to energize said engagement member in a direction to be engaged with said rear curtain interlocking part; and
  d. a second energizing means to energize said engagement member for movement in a direction opposite to that of said first energizing means.

11. The device as defined in claim 2, further comprising interlocking release means which is engaged with said control means, and is interlocked with the film winding means so that its engagement with the control means may be released at the completion of shutter charging.

12. The device as defined in claim 3, wherein said rear curtain means is disposed to displace to said first position in an interlocked relationship with rotation of said control member at the time of shutter charging, while accumulating positional energy thereof, and to further displace to said second position by discharging said positional energy after release of such engagement due to said rear curtain control means.

* * * * *